(12) United States Patent
Chen et al.

(10) Patent No.: US 11,432,191 B2
(45) Date of Patent: *Aug. 30, 2022

(54) HYBRID AUTOMATIC REPEAT REQUEST ACKNOWLEDGE RESOURCE ALLOCATION FOR ENHANCED PHYSICAL DOWNLINK CONTROL CHANNEL

(71) Applicant: Texas Instruments Incorporated, Dallas, TX (US)

(72) Inventors: Runhua Chen, Plano, TX (US); Anthony E. Ekpenyong, Houston, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/901,932

(22) Filed: Jun. 15, 2020

(65) Prior Publication Data

US 2020/0314691 A1 Oct. 1, 2020

Related U.S. Application Data

(63) Continuation of application No. 15/877,362, filed on Jan. 22, 2018, now Pat. No. 10,687,247, which is a
(Continued)

(51) Int. Cl.
*H04W 28/06* (2009.01)
*H04L 1/06* (2006.01)
(Continued)

(52) U.S. Cl.
CPC ............... *H04W 28/06* (2013.01); *H04L 1/06* (2013.01); *H04L 1/1812* (2013.01);
(Continued)

(58) Field of Classification Search
CPC ...... H04W 28/06; H04W 72/042; H04L 1/06; H04L 1/1861; H04L 5/0055; H04L 1/1812; H04L 5/0051
See application file for complete search history.

(56) References Cited

U.S. PATENT DOCUMENTS 6,011,784 A * 1/2000 Brown et al. ............. 370/329
2012/0120817 A1* 5/2012 Khoshnevis et al. ..... 370/252
(Continued)

FOREIGN PATENT DOCUMENTS

WO 2010077103 A2 7/2010

OTHER PUBLICATIONS

Prosecution Hisotry, U.S. Appl. No. 13/526,270, filed Jun. 18, 2012, 464 pages.
(Continued)

*Primary Examiner* — Charles C Jiang
*Assistant Examiner* — Thad N Defauw
(74) *Attorney, Agent, or Firm* — Gregory J. Albin; Charles A. Brill; Frank D. Cimino

(57) ABSTRACT

A method and apparatus of wireless communication between a base station and at least one user equipment. The method includes: transmitting an enhanced physical downlink control channel from the base station to the at least one user equipment using a demodulation reference signal antenna port; transmitting message from the base station to the at least one user equipment which is scheduled by the enhanced physical downlink control channel; receiving the message at the at least one user equipment; determining at the at least one user equipment whether the message was correctly received; and transmitting an ACK/NAK signal on an ACK/NAK resource determined from the enhanced physical downlink control channel from the at least one user
(Continued)

equipment to the base station indicating whether the message was correctly received by the at least one user.

24 Claims, 5 Drawing Sheets

Related U.S. Application Data continuation of application No. 15/230,167, filed on Aug. 5, 2016, now Pat. No. 9,877,230, which is a continuation of application No. 13/526,270, filed on Jun. 18, 2012, now Pat. No. 9,413,509.

(60) Provisional application No. 61/498,063, filed on Jun. 17, 2011.

(51) Int. Cl.
    *H04L 1/18*     (2006.01)
    *H04W 72/04*     (2009.01)
    *H04L 5/00*     (2006.01)
    *H04W 88/02*     (2009.01)

(52) U.S. Cl.
    CPC .......... *H04L 1/1861* (2013.01); *H04L 5/0051* (2013.01); *H04L 5/0055* (2013.01); *H04W 72/042* (2013.01); *H04W 88/02* (2013.01)

(56) References Cited

U.S. PATENT DOCUMENTS

2012/0170533 A1    7/2012    Ahn et al.
2012/0263121 A1\*  10/2012  Chen et al. .................. 370/329
2012/0320846 A1\*  12/2012  Papasakellariou et al. .. 370/329

OTHER PUBLICATIONS

Prosecution Hisotry, U.S. Appl. No. 15/230,167, filed Aug. 5, 2016, 167 pages.

Prosecution Hisotry, U.S. Appl. No. 15/877,362, filed Jan. 22, 2018, 850 pages.

\* cited by examiner

HYBRID AUTOMATIC REPEAT REQUEST ACKNOWLEDGE RESOURCE ALLOCATION FOR ENHANCED PHYSICAL DOWNLINK CONTROL CHANNEL

CLAIM OF PRIORITY

This application is a continuation of U.S. patent application Ser. No. 15/877,362 filed Jan. 22, 2018, which is a continuation of U.S. patent application Ser. No. 15/230,167 filed Aug. 5, 2016, now U.S. Pat. No. 9,877,230, which is a continuation of U.S. patent application Ser. No. 13/526,270, filed Jun. 18, 2012, now U.S. Pat. No. 9,413,509, which claims priority from U.S. Provisional Application No. 61/498,063, filed Jun. 17, 2011, the contents of each of which are incorporated by reference in their entirety.

TECHNICAL FIELD OF THE INVENTION

The technical field of this invention is wireless communication such as wireless telephony.

BACKGROUND OF THE INVENTION

The present embodiments relate to wireless communication systems and, more particularly, to the transmission of Hybrid Automatic Repeat Request acknowledgments in response to multi-input multi-output (MIMO) transmissions of data and dedicated reference signals with codebook-based feedback on the Physical Downlink shared channel (PDCCH).

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Cell-specific Reference signals (CRS), Channel State Information Reference Signals (CSI-RS) and Dedicated or Demodulating Reference Signals (DMRS). These reference signals are useful for channel estimation at the receiver for data demodulation and also to support link adaptation at the transmitter. In a multi-input multi-output (MIMO) communication systems with multiple transmit/receive antennas, the data transmission is performed via precoding. Here, precoding refers to a linear (matrix) transformation of a L-stream data into P-stream where L denotes the number of layers (also termed the transmission rank) and P denotes the number of transmit antennas. With the use of dedicated user-specific DMRS, a transmitter (base station, also termed eNodeB or eNB) can perform any precoding operation which is transparent to a user equipment (UE) which acts as a receiver. At the same time, it is beneficial for the base station to obtain a recommendation on the choice of precoding matrix from the user equipment. This is particularly the case for frequency-division duplexing (FDD) where the uplink and downlink channels occupy different parts of the frequency bands, i.e. the uplink and downlink are not reciprocal. Hence, a codebook-based feedback from the UE to the eNodeB is preferred. To enable a codebook-based feedback, a precoding codebook needs to be designed. UE measures the downlink MIMO channel and feeds back the channel by using the feedback codebook. Specifically, UE reports a precoding matrix indicator (PMI) corresponding to a recommended precoding matrix from the feedback codebook, as well as channel quality indicators (CQI) which reflects the receive signal quality when the recommended PMI is used for MIMO precoding.

The Rel. 8 Long-Term Evolution (LTE) specification includes a codebook for 2-antenna transmissions and a codebook for 4-antenna transmissions. While those codebooks are designed efficiently, they do not support transmissions with 8 antennas. Moreover, it is possible to further improve the performance of 4-antenna transmissions under different scenarios such as dual-polarized antenna arrays. To address these issues, an 8-Tx codebook was adopted in LTE Rel. 10 for the purpose of channel feedback for an 8-antenna system.

While the preceding approaches provide steady improvements in wireless communications, the present inventors recognize that still further improvements in downlink (DL) spectral efficiency are possible. Accordingly, the preferred embodiments described below are directed toward these problems as well as improving upon the prior art.

SUMMARY OF THE INVENTION

A method and apparatus of wireless communication between a base station and at least one user equipment. The method includes: transmitting an enhanced physical downlink control channel from the base station to the at least one user equipment using a demodulation reference signal antenna port; transmitting message from the base station to the at least one user equipment which is scheduled by the enhanced physical downlink control channel; receiving the message at the at least one user equipment; determining at the at least one user equipment whether the message was correctly received; and transmitting an ACK/NAK signal on an ACK/NAK resource determined from the enhanced physical downlink control channel from the at least one user equipment to the base station indicating whether the message was correctly received by the at least one user.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
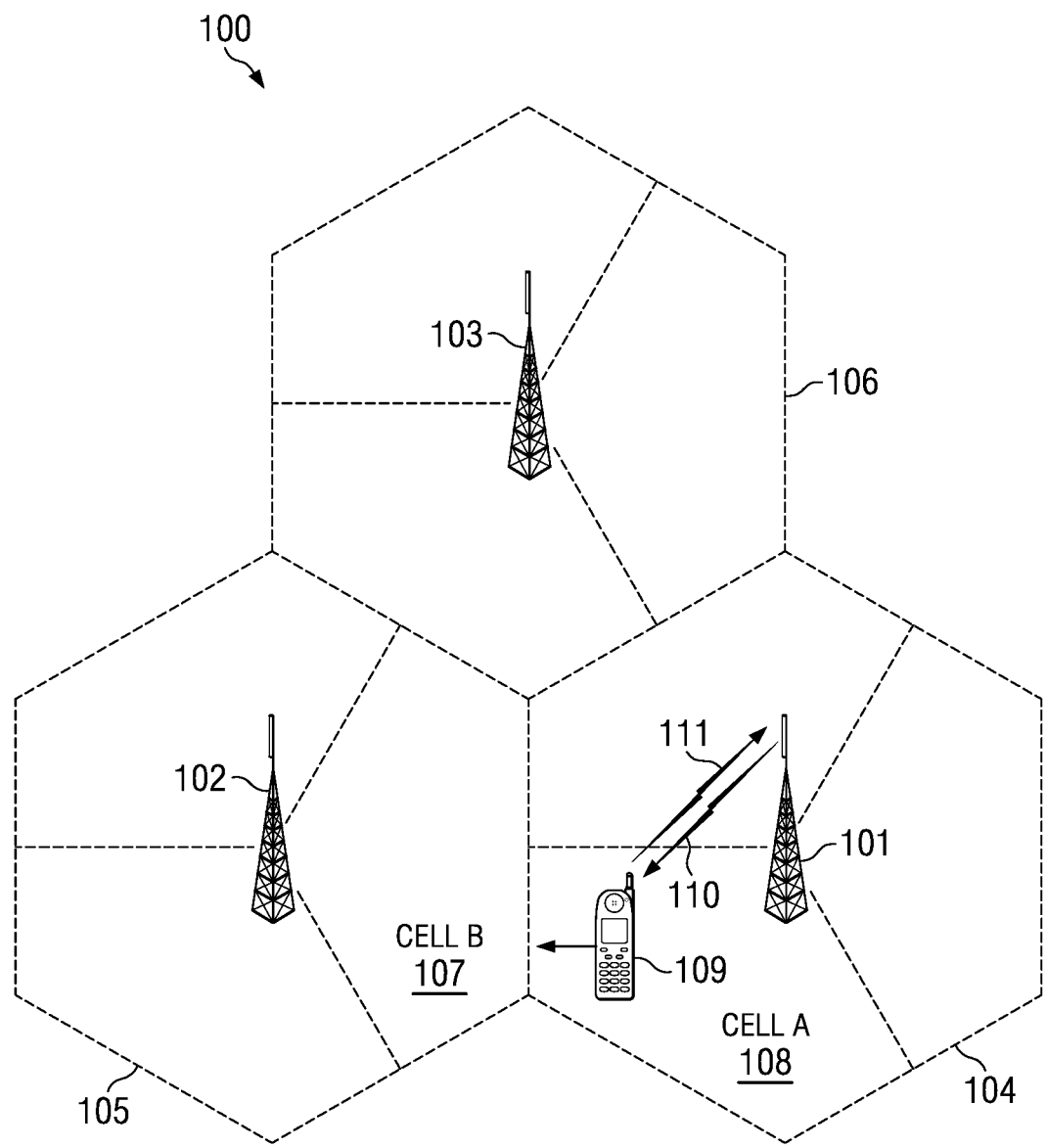
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
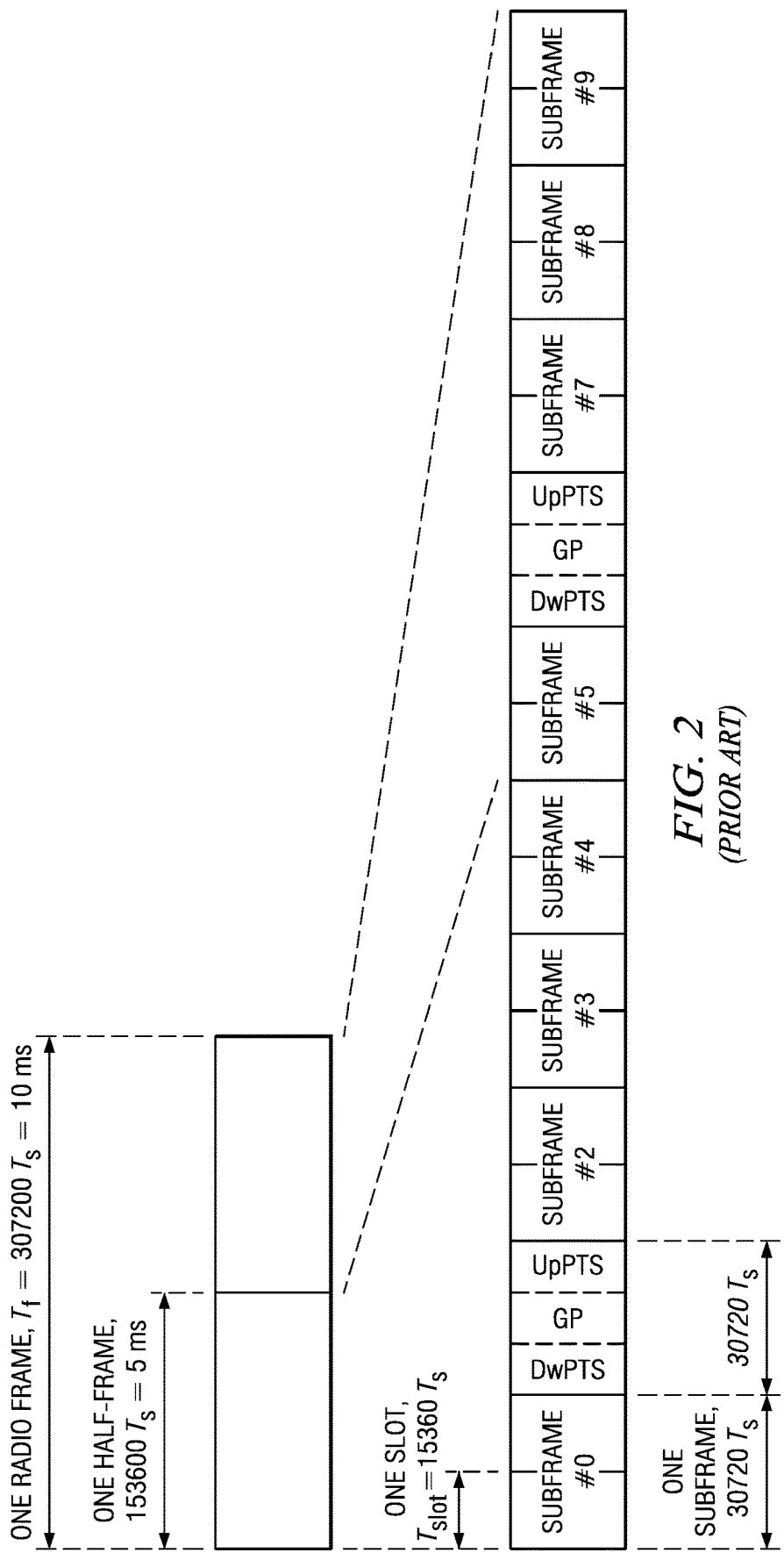
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Figure 3:
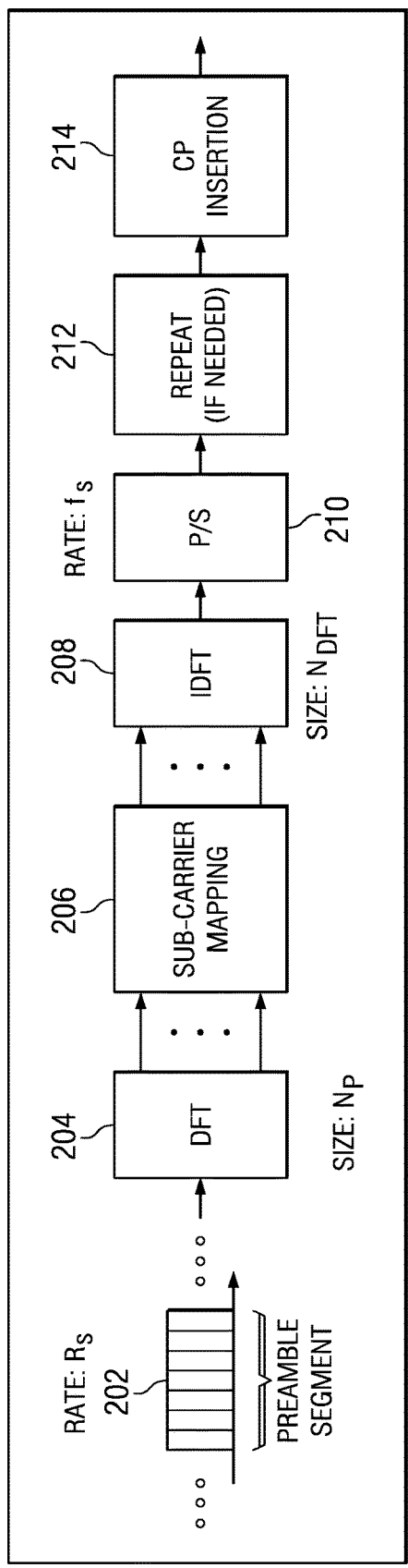
FIG. 3 is a block diagram of a transmitter of the present invention.

FIG. 3 is a block diagram of a wireless transmitter 200 of the present invention for transmitting a preamble 202 to a remote receiver. The preamble is preferably a CAZAC sequence for generating the random access preamble signal. CAZAC sequences are complex valued sequences with following two properties: 1) Constant Amplitude (CA), and 2) Zero Cyclic Autocorrelation (ZAC). Examples of CAZAC sequences include but are not limited to: Chu Sequences; Frank-Zadoff Sequences; Zadoff-Chu (ZC) Sequences; and Generalized Chirp-Like (GCL) Sequences.

Zadoff-Chu (ZC) sequences are defined by:

$$a_M(k) = e^{\left[j2\pi(M/N)\left[k\frac{(k+1)}{2}+qk\right]\right]} \text{ for } N \text{ odd}$$

-continued $$a_M(k) = e^{\left[j2\pi(M/N)\left[\frac{k^2}{2}+qk\right]\right]} \text{ for } N \text{ even}$$

where: N is the length of the sequence; M is the index of the root ZC sequence with M and N being relatively prime; q is any fixed integer; and k is the index of the sequence element ranging from 0 to N−1. These are representative examples of CAZAC sequences. An alternative convention for ZC definition replaces j in the above formula by −j. Either convention can be adopted. In the above formula, making N a prime number maximizes the set of non-orthogonal root ZC sequences having optimal cross-correlation. When N is prime, there are (N−1) possible choices for M. Each such choice results in a distinct root ZC CAZAC sequence. In this application the terms Zadoff-Chu, ZC and ZC CAZAC will be used interchangeably. The term CAZAC denotes any CAZAC sequence, ZC or otherwise.

In a preferred embodiment of the invention, random access preamble signal 202 is constructed from a CAZAC sequence, such as a ZC sequence. Additional modifications to the selected CAZAC sequence can be performed using any of the following operations: multiplication by a complex constant, Discrete Fourier Transform (DFT), inverse Discrete Fourier Transform (IDFT), Fast Fourier Transform (FFT), inverse Fast Fourier Transform (IFFT), cyclic shifting, zero padding, sequence block repetition, sequence truncation, sequence cyclic extension and others. In the preferred embodiment of the invention, UE 200 selects random access preamble signal 202, by selecting a CAZAC sequence and optionally modified as noted above. DFT circuit 204 receives the modified CAZAC sequence to produce a frequency domain signal. Sub-carrier mapping circuit 206 receives the frequency domain signal. Sub-carrier mapping circuit maps the preamble to user selected tones. IDFT circuit 208 then converts the user selected tones to a time domain signal which is supplied to parallel-to-serial converter 210. The resulting preamble is optionally repeated to achieve the desired duration. Cyclic prefix (CP) circuit 214 adds a cyclic prefix to the preamble before transmission to a remote receiver.

Figure 4:
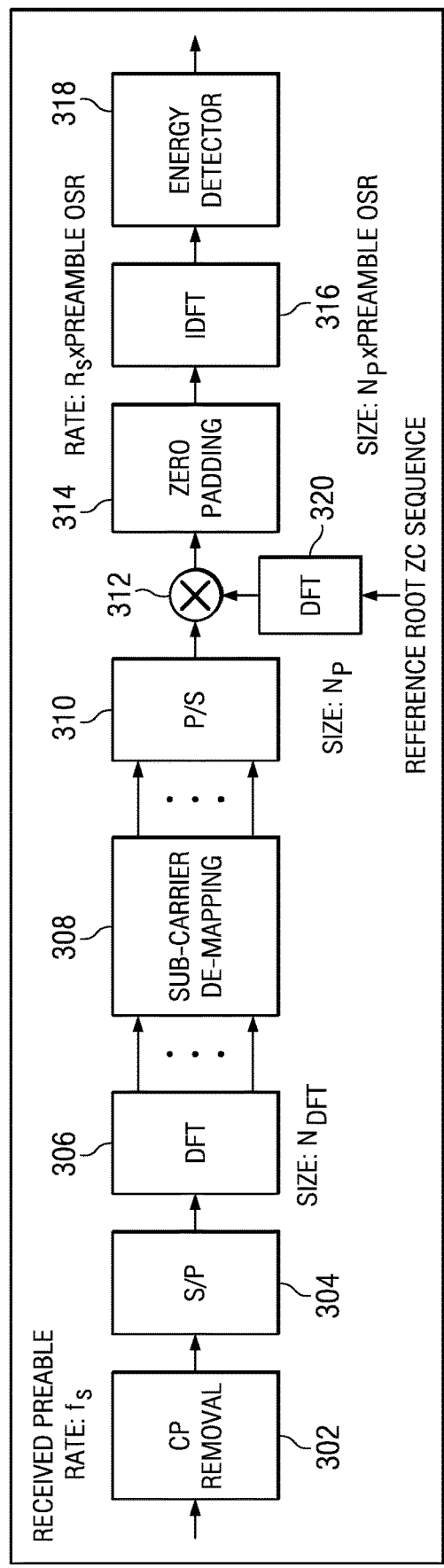
FIG. 4 is a block diagram of a receiver of the present invention.

FIG. 4 is a block diagram of an embodiment of a random access channel receiver 300 of the present invention. CP removal circuit 302 removes the cyclic prefix from the received random access signal. Serial-to-parallel converter 304 converts the resulting preamble into a parallel signal. DFT circuit 306 produces sub-carrier mapped tones from the parallel preamble components. Sub-carrier de-mapping circuit 308 demaps the mapped tones. These demapped tones are equivalent to the output signal from DFT circuit 204 of transmitter 200 (FIG. 2). Parallel-to-serial circuit 310 converts the parallel demapped tones into a serial data stream. Product circuit 312 receives this serial data stream and a reference root sequence from DFT circuit 320. Product circuit 312 computes a tone by tone complex multiplication of demapped tones with the reference tones. Zero padding circuit 314 adds a number of zeros necessary to produce a correct sequence length. IDFT circuit 316 converts the multiplied frequency tones into time domain signals. These time domain signals include concatenated power delay profiles of all cyclic shift replicas of the preamble root sequence. Energy detector circuit 318 detects the energy in the time domain signals. This identifies the received preamble sequences by detecting the time of peak correlation between received random access preamble signals and the reference ZC root sequence.

For DL data transmission from a transmitter to a receiver, a corresponding HARQ-ACK report is transmitted in the uplink from the receiver to the transmitter. An ACK response indicates a successful decoding at the receiver while a NAK indicates a failed decoding. In the case of a NAK response, a retransmission may be scheduled.

In prior wireless communication systems, ACK/NAK is reported on the physical uplink control channel (PUCCH) where the PUCCH ACK/NAK resource is semi-statically configured or can be dynamically allocated. A user equipment can be configured to transmit the ACK/NAK on either PUCCH Format 1a/1b or PUCCH Format 3. For dynamic allocation the PUCCH resource for FDD is determined as:

$$n_{PUCCH} = n_{CCE} + N_{PUCCH}^{(1)} \quad (1)$$

where: $n_{cCE}$ is the index of the lowest control channel elements (CCE) in the corresponding physical downlink control channel (PDCCH); and $N_{PUCCH}^{(1)}$ is a cell-specific offset which delineates the semi-static PUCCH format 1a/1b region from the dynamic PUCCH format 1a/1b region and is semi-statically configured by higher layer signaling. The PDCCH carries a downlink grant and conveys the downlink scheduling information to the UE. The UE performs PDCCH blind decoding to find the downlink grant before proceeding to decode the downlink data. The PDCCH may be transmitted with an aggregation level of 1, 2, 4 or 8 control channel elements (CCE). A CCE is the basic unit for control channel resource allocation. In legacy wireless communications systems such as LTE Rel. 8 to 10, the control region is cell-specific designated and allocated in the first 3 of 4 OFDM symbols in a subframe. CCEs in the common control region are indexed as 0 to N_CCE−1. This is commonly known by all UEs.

The PDCCH in legacy LTE Rel. 8 to 10 is designed with Cell-specific Reference Symbols (CRS) based transmission. A PDCCH is scrambled with the Cell-Radio Network Temporary Identifier (C-RNTI) of the user being scheduled. This is precoded with 1/2/4 transmit (Tx) antenna diversity, cross-interleaved with other PDCCHs and then transmitted in the entire system bandwidth in the control region of a subframe. The control region contains the first NOFDM symbols in the first slot of a subframe. These are N=1, 2, 3 for bandwidths greater than 10 physical resource blocks (PRB) or N=2, 3, 4 otherwise. The value of N is known as the Control Format Indicator (CFI) and is signaled on the Physical Control Format Indicator CHannel (PCFICH). Through CRS-based transmit diversity and cross-interleaving within the system bandwidth, Rel. 10 PDCCH exploits the spatial and frequency diversity to maximize the robustness of the control signal and to ensure reliable reception and coverage in a cell.

Enhanced PDCCH is proposed for LTE Rel. 11. Enhanced PDCCH is hereafter referred to as ePDCCH. The ePDCCH inherits all the Downlink Control Indicator (DCI) formats of legacy LTE systems including DCI formats 0, 1, 1A, 1B, 1C, 1D, 2, 2A, 2B, 2C, and 4. The ePDCCH relies on DMRS based transmit diversity rather than CRS based transmit diversity. For each UE a semi-statically configured downlink resource is reserved for ePDCCH. The UE performs blind decoding of the semi-statically configured resources for the ePDCCH. The ePDCCH is transmitted on a single DMRS antenna port such as antenna port 7 or 8 with a scrambling sequence identity (SCID) equal to 0 and DMRS based rank-1 precoding.

Multiuser, Multiple Input, Multiple Output (MU-MIMO) for ePDCCH is also being proposed for LTE Rel. 11 to transmit multiple ePDCCH to different UEs using the same time/frequency resources. This is an effective means to increase the ePDCCH capacity by exploiting spatial multiplexing of the DL control channel. Exemplary embodiments of MU-MIMO for ePDCCH can be found in U.S. patent application Ser. No. 13/458,410, entitled "PHYSICAL DOWNLINK CONTROL CHANNEL AND PHYSICAL HYBRID AUTOMATIC REPEAT REQUEST INDICATOR CHANNEL ENHANCEMENTS" filed Apr. 27, 2012. The first ePDCCH is transmitted on antenna port 7 with SCID=0. The second ePDCCH is transmitted on antenna port 7, with SCID=1. The third ePDCCH is transmitted on antenna port 8, with SCID=0 or 1.

There is a possible collision of LTE Rel. 11 HARQ-ACK transmissions as follows. When two ePDCCHs of two UEs are spatial multiplexed with MU-MIMO, it is possible that the ACK/NAK responses of these two Rel. 11 UEs are mapped to the same HARQ-ACK resource according to equation (1) if $N_{PUCCH}^{(1)}$ and $n_{CCE}$ satisfy the same criteria of equation (1). In this case, a new mechanism for determining the HARQ-ACK resource is needed to avoid HARQ-ACK collision and to ensure reliable HARQ-ACK reception and system performance.

There is also a possible collision of LTE Rel. 10 and Rel. 11 HARQ-ACK as follows. The legacy (LTE Rel. 10) PUCCH resource allocation was based on the PDCCH region. The ePDCCH is located in the PDSCH region. In order to reduce the PUCCH overhead it may be necessary to allow some overlap between PUCCH region indicated by legacy PDCCH and the PUCCH region indicated by the ePDCCH. Thus a new PUCCH resource allocation is required that can also avoid collisions between ACK/NAK resources corresponding to PDSCH transmissions scheduled by either PDCCH or ePDCCH.

The ePDCCH can be aggregated in terms of CCEs or in terms of physical resource blocks (PRBs). Hereafter, the term CCE refers interchangeably to either the control channel element for the PDCCH or the ePDCCH. This invention is expressed in terms of the CCE index $n_{CCE}$. This invention is equally applicable when ePDCCH is aggregated in terms of PRB, where $n_{CCE}$ is replaced by the lowest PRB index $n_{PRB}$. When there is no confusion, this application uses $n_{CCE}$, $n_{PRB}$ and $n_{index}$ interchangeably. HARQ-ACK resource for ePDCCH In LTE Rel. 11, a cell-specific common control region is needed in many cases such as for support of legacy LTE Rel. 8 to Rel. 10 UEs and for Radio Resource Control (RRC) configuration or reconfiguration of Rel. 11 UEs. In this case the common control region and its CCE indexing remain the same as in Rel. 8 to 10. Then for a Rel. 11 UE configured with ePDCCH there are two cases.

For cross-interleaved/CRS-based ePDCCH, the ePDCCH is aggregated in terms of CCE. In Extended indexing the CCE in the ePDCCH region is indexed from $N_{CCE}$ to $N_{CCE}+M_{CCE}-1$, where $M_{CCE}$ is the number of CCEs in the ePDCCH region. In Separate indexing the CCE in the ePDCCH region are indexed from 0 to $M_{CCE}-1$.

For non-cross-interleaved/DMRS-based ePDCCH, the ePDCCH is aggregated in terms of PRB. In Extended indexing the PRB in the ePDCCH region is indexed from $N_{CCE}$ to $N_{CCE}+M_{PRB}-1$, where $M_{PRB}$ is the number of PRB in the ePDCCH region. In Separate indexing the PRB in the ePDCCH region are indexed from 0 to $M_{PRB}-1$.

In both cases the ePDCCH region is UE specific and each UE has no knowledge of the existence or the size of the ePDCCH configuration of the other UE. Thus, different CCEs in different ePDCCH regions of the two UEs may end up with the same CCE index. This leads to collision of ACK/NAK resources.

For example suppose UE1 is configured with an ePDCCH region of 6 resource blocks (RBs) in PRB [0-5] and ePDCCH1 is transmitted with 1-PRB aggregation level on PRB 1. Suppose also UE2 is configured with an ePDCCH region of 6 RB in PRB [6-11] and ePDCCH2 is transmitted with 1-PRB aggregation level, on PRB7. In this case ePDCCH1 and ePDCCH2 both have $n_{index}=1$ and therefore their ACK/NAK resources collide.

In a first embodiment of this invention for ePDCCH with no-cross-interleaving/DMRS-based transmission, the ePDCCH is indexed by the position of its lowest PRB in the entire system bandwidth. Thus each PRB in the system bandwidth is indexed as $0-N_{DL}-1$, where $N_{DL}$ is the downlink system bandwidth expressed in PRBs. For example suppose UE1 is configured with ePDCCH region of 6 RBs in PRB [0-5] and ePDCCH1 is transmitted with 1-PRB aggregation level on PRB 1. Suppose also that UE2 is configured with ePDCCH region of 6 RB, in PRB [6-11] and ePDCCH2 is transmitted with 1-PRB aggregation level on PRB7. In accordance with this embodiment ePDCCH1 is indexed as $n_{index}=1$ and ePDCCH2 is indexed as $n_{index}=7$.

The inventors expect that early deployments of LTE Rel. 11 systems would support only a limited number of Rel. 11 UEs. Thus backward compatible serving cells should contain the legacy control regions to support Rel. 8/9/10 UEs. If only a few Rel. 11 UEs are configured to receive DCI on the ePDCCH, the PUCCH DCI format 1a/1b/3 resource for such UEs can be semi-statically configured.

The overhead for the semi-static allocation is not expected to be large if only a few Rel. 11 UEs are scheduled in a subframe. One possibility to reduce the overhead of semi-static configuration of PUCCH DCI format 1a/1b resources is to configure the UE with a set of four PUCCH resources and dynamically indicate the assigned PUCCH resource using a HARQ-ACK resource indicator (ARI). This is similar to the resource allocation procedure for PUCCH DCI format 3 in Rel. 10. A side benefit of this approach is that the ARI can be used to avoid collisions in the case of partial overlap between the PUCCH regions indicated by Rel. 8 to 10 PDCCH and the Rel. 11 and beyond ePDCCH.

To minimize the change from legacy resource allocation the same formula in equation (1) can be modified for Rel. 11 HARQ-ACK resource allocation. If a DMRS-based PRB-specific ePDCCH is configured, the lowest-indexed PRB for the ePDCCH can be used in place of the CCE index. If CRS-based ePDCCH is possible in Rel. 11, an extended CCE indexing scheme beyond Rel. 10 can be used for the resource allocation. An enhanced dynamic PUCCH DCI format 1a/1b region can be defined by a new offset parameter denoted $N_{PUCCH,e}^{(1)}$. In this embodiment the dynamic PUCCH region is sub-divided into a legacy region and an enhanced region. When a Rel. 11 UE is configured by higher layers to receive its DCI on the ePDCCH and also to use DCI format 1a/1b for HARQ-ACK transmission it determines its HARQ-ACK resource as:

$$n_{PUCCH}^{(1)}=n_{index}+N_{PUCCH}^{(1)}+g(N_{PUCCH,e}^{(1)}) \quad (2)$$

where: $n_{index}$ can be the lowest indexed PRB or lowest indexed CCE; and $g(N_{PUCCH,e}^{(1)})$ is a function of the extended offset parameter, which can be defined based on the ePDCCH type.

If a CRS-based ePDCCH is defined, the same concept of CCEs is used wherein $0, \ldots, N_{CCE,k}-1$ is the set of Rel. 10 CCEs in subframe k and $N_{CCE,k}, \ldots, M_{CCE,k}-1$ defines the set of Rel. 11 CCEs corresponding to the ePDCCH and $g(N_{PUCCH,e}^{(1)})=0$. Thus the HARQ-ACK resource allocation for the ePDCCH is a straightforward extension of the Rel. 8/9/10 technique. The particular implementation the eNB dimensions the PUCCH region to support HARQ-ACK resources corresponding to the DCI scheduled on both the PDCCH and ePDCCH. This embodiment precludes spatial multiplexing of DCIs for multiple UEs on the same CCEs because this would result in HARQ-ACK resource collision.

An example of the DMRS-ePDCCH is $g(N_{PUCCH,e}^{(1)})=N_{PUCCH,e}^{(1)}$ where the Rel. 11 PUCCH HARQ-ACK resource allocation is based on the lowest-indexed PRB for the ePDCCH allocation $n_{PRB}$. Similarly the eNB should dimension the PUCCH region appropriately. Extensions to this scheme is required when two or more UEs receive their control information on the same physical or logical resources as described below.

Note that $g(N_{PUCCH,e}^{(1)})=N_{PUCCH,e}^{(1)}$ can be UE-specific. For example UE1 can be configured with $g(N_{PUCCH,e}^{(1)})=N_{PUCCH,e}^{(1)}$ and UE2 is configured with $g(N_{PUCCH,e}^{(1)})=N_{PUCCH,e}^{(1)}+1$. The ACK/NAK responses of UE1 and UE2 will not collide even if ePDCCHs of these two UEs are multiplexed and share the same CCE index. In an alternative embodiment $g(N_{PUCCH,e}^{(1)})$ can encompass the total UE-specific offset and the HARQ-ACK resource is determined as:

$$n_{PUCCH}^{(1)}=n_{index}+g(N_{PUCCH,e}^{(1)}) \quad (3)$$

The HARQ-ACK resource can be further determined as a function of the scrambling sequence on the CRC of the corresponding ePDCCH:

$$n_{PUCCH}^{(1)}=n_{CCE}+N_{PUCCH}^{(1)}+N_{PUCCH,e}^{(1)}+g'(\text{CRC\_scrambling\_sequence\_ID})$$

For example, two scrambling sequences can be defined to mask the CRC bits of an ePDCCH. A first ePDCCH with CRC scrambled by scrambling sequence ID 1 transmits HARQ-ACK resource on $n_{PUCCH}^{(1)}=n_{CCE}+N_{PUCCH}^{(1)}+N_{PUCCH,e}^{(1)}+0$, while a second ePDCCH with CRC scrambled by scrambling sequence ID 2 transits HARQ-ACK resource on $n_{PUCCH}^{(1)}=n_{CCE}+N_{PUCCH}^{(1)}+N_{PUCCH,e}^{(1)}+1$. By dynamically selecting the CRC scrambling sequence, the network is able to dynamically configure the HARQ-ACK resource of a UE.

The HARQ-ACK resource is further determined as a function of the DMRS antenna port of the corresponding ePDCCH downlink grant:

$$n_{PUCCH}^{(1)}=n_{CCE}+N_{PUCCH}^{(1)}+N_{PUCCH,e}^{(1)}+g'(\text{DMRS\_port\_PDCCH})$$

For example, if $g(x)=x-7$, then the HARQ-ACK corresponding to ePDCCH on antenna port 7 is transmitted on HARQ-ACK resource $n_{PUCCH}=n_{CCE}+f(N_{PUCCH})+0$, while the HARQ-ACK corresponding to ePDCCH on antenna port 8 is transmitted on HARQ-ACK resource $n_{PUCCH}=n_{CCE}+f(N_{PUCCH})+1$.

The HARQ-ACK resource is further determined as a function of the DMRS scrambling sequence identity (SCID) of the corresponding ePDCCH:

$$n_{PUCCH}=n_{CCE}+f(N_{PUCCH})+g(\text{SCID\_PDCCH})$$

For example, if $g(x)=x$, then the HARQ-ACK corresponding to an ePDCCH with SCID=0 is transmitted on HARQ-ACK resource $n_{PUCCH}=n_{CCE}+f(N_{PUCCH})+0$ and HARQ-ACK corresponding to an ePDCCH with SCID=1 is transmitted on HARQ-ACK resource $n_{PUCCH}=n_{CCE}+f(N_{PUCCH})+1$.

It is further possible to use the combination of prior embodiments or a subset thereof, to determine the PUCCH HARQ-ACK resources. For example, the HARQ-ACK resource is determined as a function of the DMRS antenna port ID and SCID of the corresponding ePDCCH as:

$$n_{PUCCH} = n_{CCE} + f(N_{PUCCH}) + g(\text{SCID\_PDCCH}, \text{DMRS\_port\_PDCCH})$$

where: an exemplary function of g is given as:

TABLE 2

| SCID_PDCCH | DMRS_port_PDCCH | g(SCID_PDCCH, DMRS_port_PDCCH) |
|---|---|---|
| 0 | 7 | 0 |
| 1 | 7 | 1 |
| 0 | 8 | 2 |
| 1 | 8 | 3 |

TABLE 3

| SCID_PDCCH | DMRS_port_PDCCH | g(SCID_PDCCH, DMRS_port_PDCCH) |
|---|---|---|
| 0 | 7 | 0 |
| 0 | 8 | 1 |
| 1 | 7 | 2 |
| 1 | 8 | 3 |

Yet another possible example is given by:

$$n_{PUCCH} = n_{CCE} + f(N_{PUCCH}) + N_{CCE} \times g(\text{SCID\_PDCCH}, \text{DMRS\_port\_PDCCH})$$

where: $N_{CCE}$ is the total number of available CCEs for ePDCCH on a single antenna port with a single SCID without MU-MIMO of ePDCCH. The physical interpretation of this approach can be explained as follows: MU-MIMO for ePDCCH essentially increases the ePDCCH capacity by creating more control resources that are associated with multiple antenna ports and multiple SCID. For the conventional ePDCCH transmitted on port 7 with SCID=0, the CCE indexing follow the conventional indexing from 0 to $N_{CCE}-1$. For additional ePDCCH resources on an additional antenna port and SCID, the CCE indexing is incremented by a fudge factor to reflect the ePDCCH resource increase. For example according to Table 2: the ePDCCH on antenna port 7 with SCID 1 are indexed as $N_{CCE}, N_{CCE}=1, \ldots 2N_{CCE}-1$; the ePDCCH on antenna port 8 with SCID 0 are indexed as $2N_{CCE}, 2N_{CCE}+1, \ldots 3N_{CCE}-1$; and the ePDCCH on antenna port 8 with SCID 1 are indexed as $3N_{CCE}, 3N_{CCE}+1, \ldots 4N_{CCE}-1$.

Figure 5:
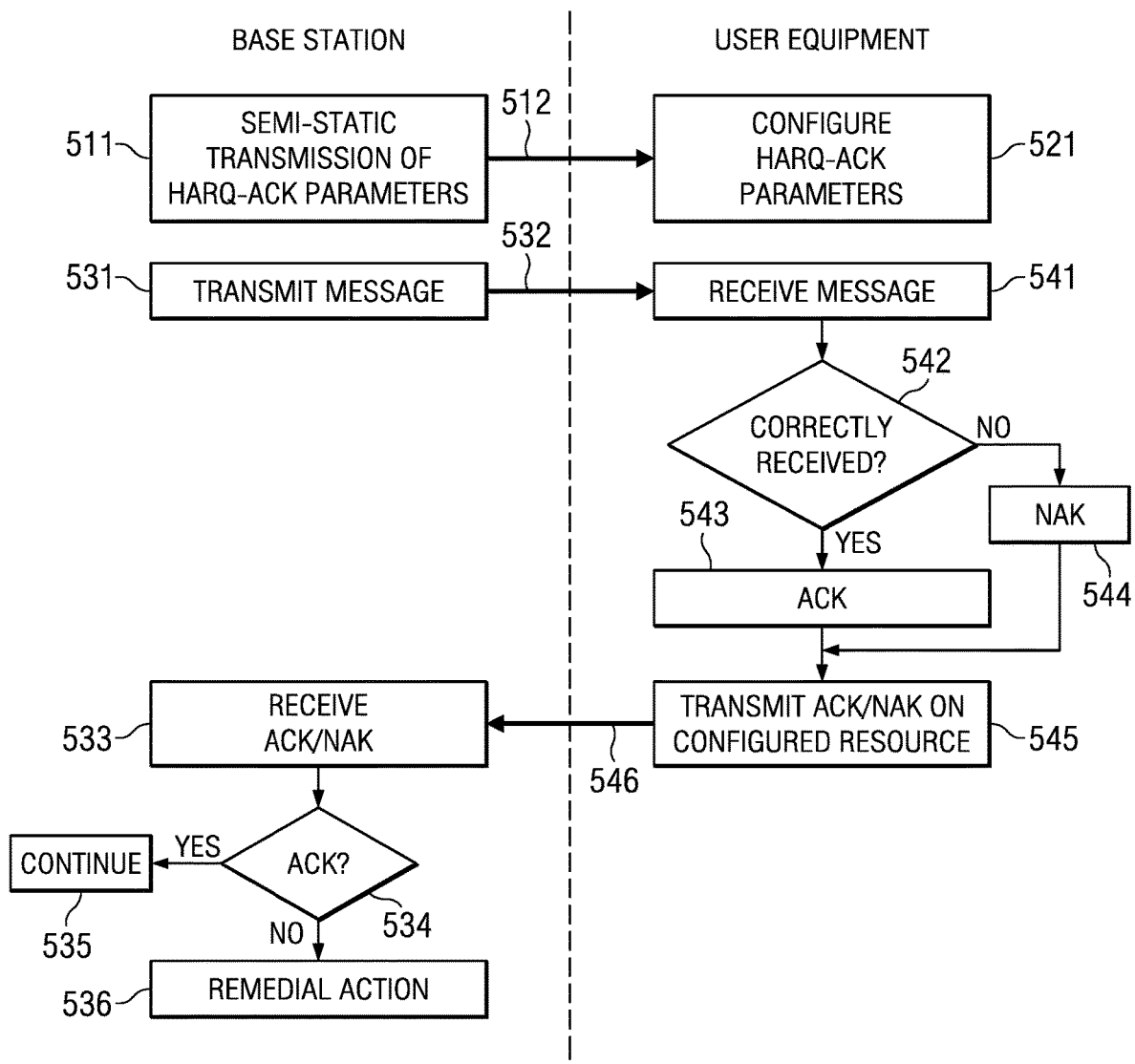
FIG. 5 is a flow diagram of the operation of this invention.

FIG. 5 illustrates the message/data flow in accordance with this invention. As noted in FIG. 5 operations left of the dashed line are preformed by a base station and operations right of the dashed line are performed by a user equipment.

The base station semi-statically transmits a radio frequency signal 512 to configure the HARQ-ACK parameters of a user equipment. As noted above these are transmitted via higher-layer signaling. The configured HARQ-ACK parameters includes those described above. In 521 the user equipment receives these parameter indicators and configures its HARQ-ACK parameters accordingly. As noted above the base station may configure HARQ-ACK parameters on a cell-specific basis. In that event transmission 512 is typically coded for only the user equipment being configures. The base station may configure the same HARQ-ACK parameters for all user equipment within the cell it serves. In that event transmission 512 is typically coded for all user equipment within the cell. As hinted in the semi-statically description this transmission takes place periodically but less often than every message 531 (described below).

At a later and generally unrelated time the base station transmits a message 531 via radio frequency signal 532. This message can be the voice of an ordinary voice telephone call or data previously requested by the user equipment. The user equipment receives this message at 541.

The user equipment determines if the message was correctly received in decision block 542. Each message transmission typically includes redundancy in the form of an error correcting code. The user equipment uses this error correcting code to determine if the message was correctly received. If the message was correctly received (Yes at decision block 542), then the user equipment selects a acknowledge (ACK) response in block 543. If the message was incorrectly received (No at decision block 542), then the user equipment selects a non-acknowledge (NAK) response in block 544. The user equipment transmits the selected ACK or NAK response on the configured resource in block 545 via radio frequency signal 546 to the base station.

The base station receives the ACK/NAK response on the configured resource in 533. If the ACK/NAK response is an acknowledgement (Yes at decision block 534), then the base station continues with its operation. Depending upon the current status transmission to the base station may be complete or the base station may transmit an addition message or messages to the user equipment. If the ACK/NAK response is a non-acknowledgement (No at decision block 534), then the base station takes remedial action at block 536. As known in the art this remedial action may include retransmission of the message, further communication between the base station and the user equipment to identify the error or the like.

Figure 6:
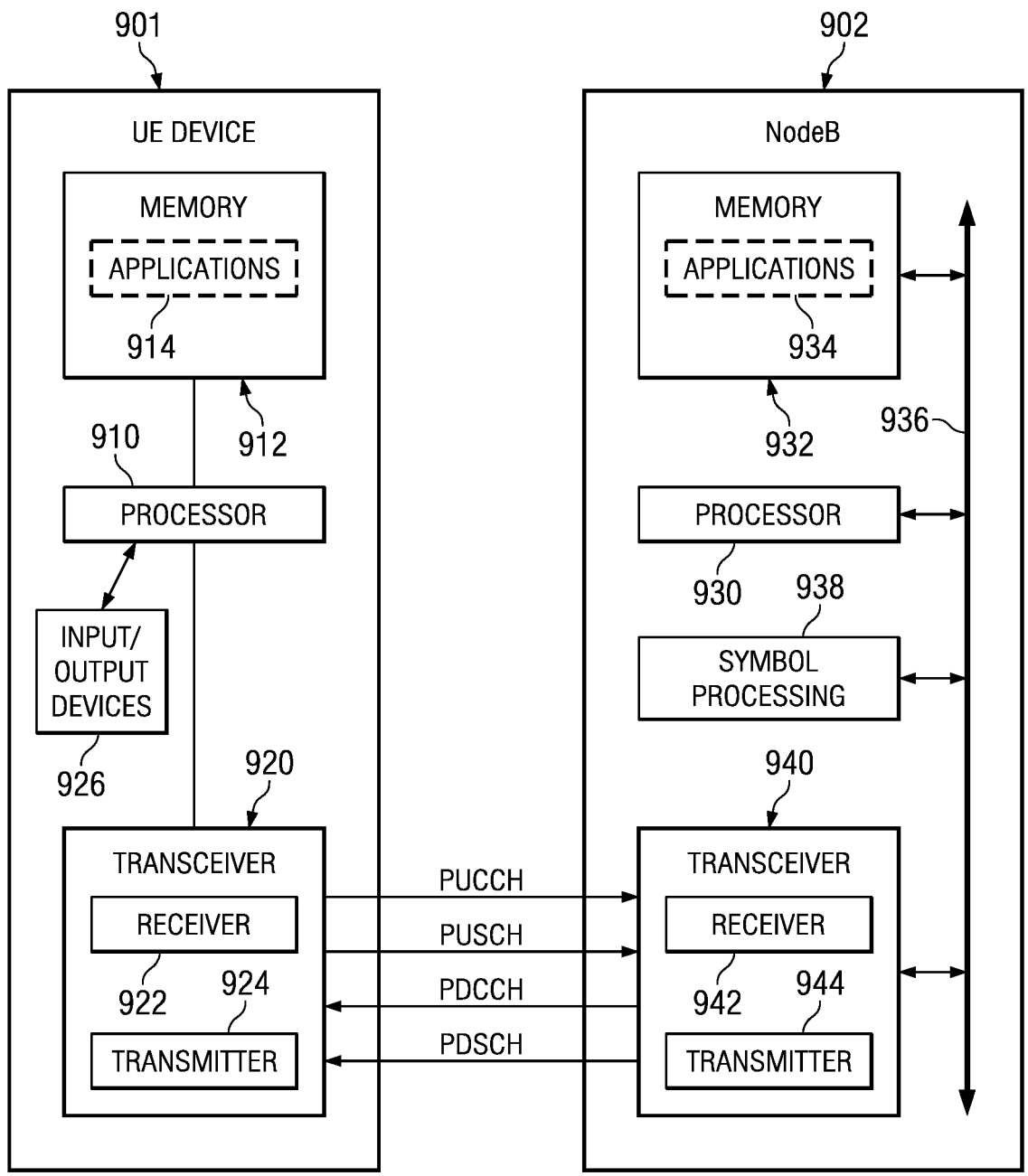
FIG. 6 is a block diagram illustrating internal details of a base station and a mobile user equipment in the network system of FIG. 1 suitable for implementing this invention.

FIG. 6 is a block diagram illustrating internal details of an eNB 902 and a mobile UE 901 in the network system of FIG. 1. Mobile UE 901 may represent any of a variety of devices such as a server, a desktop computer, a laptop computer, a cellular phone, a Personal Digital Assistant (PDA), a smart phone or other electronic devices. In some embodiments, the electronic mobile UE 901 communicates with eNB 902 based on a LTE or Evolved Universal Terrestrial Radio Access Network (E-UTRAN) protocol. Alternatively, another communication protocol now known or later developed can be used.

Mobile UE 901 comprises a processor 910 coupled to a memory 912 and a transceiver 920. The memory 912 stores (software) applications 914 for execution by the processor 910. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 901 to transmit UL signals to eNB (base-station) 902 periodically or continuously via the transceiver 920. In at least some embodiments, the mobile UE 901 identifies a Quality of Service (QoS) requirement when requesting an uplink resource from eNB 902. In some cases, the QoS requirement may be implicitly derived by eNB 902 from the type of traffic supported by the mobile UE 901. As an example, VOIP and gaming applications often involve low-latency uplink (UL) transmissions while High Throughput (HTP)/

Hypertext Transmission Protocol (HTTP) traffic can involve high-latency uplink transmissions.

Transceiver 920 includes uplink logic which may be implemented by execution of instructions that control the operation of the transceiver. Some of these instructions may be stored in memory 912 and executed when needed by processor 910. As would be understood by one of skill in the art, the components of the uplink logic may involve the physical (PHY) layer and/or the Media Access Control (MAC) layer of the transceiver 920. Transceiver 920 includes one or more receivers 922 and one or more transmitters 924.

Processor 910 may send or receive data to various input/output devices 926. A subscriber identity module (SIM) card stores and retrieves information used for making calls via the cellular system. A Bluetooth baseband unit may be provided for wireless connection to a microphone and headset for sending and receiving voice data. Processor 910 may send information to a display unit for interaction with a user of mobile UE 901 during a call process. The display may also display pictures received from the network, from a local camera, or from other sources such as a Universal Serial Bus (USB) connector. Processor 910 may also send a video stream to the display that is received from various sources such as the cellular network via RF transceiver 920 or the camera.

During transmission and reception of voice data or other application data, transmitter 924 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 912 by processor 910. In other embodiments, the message size determination may be embodied by a separate processor/memory unit, by a hardwired state machine, or by other types of control logic, for example.

eNB 902 comprises a Processor 930 coupled to a memory 932, symbol processing circuitry 938, and a transceiver 940 via backplane bus 936. The memory stores applications 934 for execution by processor 930. The applications could comprise any known or future application useful for managing wireless communications. At least some of the applications 934 may direct eNB 902 to manage transmissions to or from mobile UE 901.

Transceiver 940 comprises an uplink Resource Manager, which enables eNB 902 to selectively allocate uplink Physical Uplink Shared CHannel (PUSCH) resources to mobile UE 901. As would be understood by one of skill in the art, the components of the uplink resource manager may involve the physical (PHY) layer and/or the Media Access Control (MAC) layer of the transceiver 940. Transceiver 940 includes at least one receiver 942 for receiving transmissions from various UEs within range of eNB 902 and at least one transmitter 944 for transmitting data and control information to the various UEs within range of eNB 902.

The uplink resource manager executes instructions that control the operation of transceiver 940. Some of these instructions may be located in memory 932 and executed when needed on processor 930. The resource manager controls the transmission resources allocated to each UE 901 served by eNB 902 and broadcasts control information via the PDCCH.

Symbol processing circuitry 938 performs demodulation using known techniques. Random access signals are demodulated in symbol processing circuitry 938.

During transmission and reception of voice data or other application data, receiver 942 may receive a random access signal from a UE 901. The random access signal is encoded to request a message size that is preferred by UE 901. UE 901 determines the preferred message size by using a message threshold provided by eNB 902. In this embodiment, the message threshold calculation is embodied by executing instructions stored in memory 932 by processor 930. In other embodiments, the threshold calculation may be embodied by a separate processor/memory unit, by a hardwired state machine, or by other types of control logic, for example. Alternatively, in some networks the message threshold is a fixed value that may be stored in memory 932, for example. In response to receiving the message size request, eNB 902 schedules an appropriate set of resources and notifies UE 901 with a resource grant.

What is claimed is:

1. A method comprising:
   receiving, at a user equipment (UE), a control message on an enhanced physical downlink control channel (EPDCCH);
   receiving, at the UE, a second message indicated by the control message;
   determining, by the UE, a physical uplink control channel (PUCCH) resource for transmitting an ACK/NAK signal based on the EPDCCH, wherein the PUCCH resource for at least one EPDCCH physical resource block set is determined based on a lowest indexed control channel element and a UE-specific offset parameter; and
   transmitting, by the UE, the ACK/NAK signal on the determined PUCCH resource using PUCCH format 1a or 1b, the ACK/NACK signal indicating whether the second message was correctly received by the UE.

2. The method of claim 1, further comprising receiving a signal to determine the PUCCH resource for transmitting the ACK/NAK signal.

3. The method of claim 1, further comprising:
   receiving a configuration that includes a set of four PUCCH resources; and
   receiving an indication of a currently assigned PUCCH resource from the set of four PUCCH resources,
   wherein transmitting the ACK/NAK signal includes transmitting the ACK/NAK signal on the currently assigned PUCCH resource.

4. The method of claim 1, wherein the PUCCH resource is further determined based on a demodulation reference signal (DMRS) antenna port corresponding to the EPDCCH.

5. A user equipment (UE), comprising:
   a transceiver;
   a processor connected to the transceiver; and
   a memory connected to the processor, the memory storing instructions controlling operation of the processor and the transceiver, the instructions causing the processor and transceiver to:
   receive a control message on an enhanced physical downlink control channel (EPDCCH);
   receive a second message indicated by the control message;
   determine a physical uplink control channel (PUCCH) resource for transmitting an ACK/NAK signal based on the EPDCCH, wherein the PUCCH resource for at least one EPDCCH physical resource block set is determined based on a lowest indexed control channel element and a UE-specific offset parameter; and
transmit the ACK/NAK signal on the determined PUCCH resource using PUCCH format 1a or 1b, the ACK/NACK signal indicating whether the second message was correctly received by the UE.

6. The UE of claim 5, the instructions further causing the transceiver to receive a signal to determine the PUCCH resource for transmitting the ACK/NAK signal.

7. The method of claim 5, the instructions further causing the transceiver to:
receive a configuration that includes a set of four PUCCH resources;
receive an indication of a currently assigned PUCCH resource from the set of four PUCCH resources; and
transmit the ACK/NAK signal on the currently assigned PUCCH resource.

8. The method of claim 5, wherein the PUCCH resource is further determined based on a demodulation reference signal (DMRS) antenna port corresponding to the EPDCCH.

9. A user equipment (UE), comprising:
a transceiver configured to receive a control message on an enhanced physical downlink control channel (EPDCCH), and to receive a second message indicated by the control message; and
a processor configured to determine a physical uplink control channel (PUCCH) resource for transmitting an ACK/NAK signal based on the EPDCCH, wherein the PUCCH resource for at least one EPDCCH physical resource block set is determined based on a lowest indexed control channel element and a UE-specific offset parameter,
wherein the transceiver is further configured to transmit the ACK/NAK signal on the determined PUCCH resource using PUCCH format 1a or 1b, the ACK/NACK signal indicating whether the second message was correctly received by the UE.

10. The UE of claim 9, wherein the transceiver is further configured to receive a signal to determine the PUCCH resource for transmitting the ACK/NAK signal.

11. The method of claim 9, wherein the transceiver is further configured to:
receive a configuration that includes a set of four PUCCH resources;
receive an indication of a currently assigned PUCCH resource from the set of four PUCCH resources; and
transmit the ACK/NAK signal on the currently assigned PUCCH resource.

12. The method of claim 9, wherein the PUCCH resource is further determined based on a demodulation reference signal (DMRS) antenna port corresponding to the EPDCCH.

13. A user equipment (UE) comprising:
a transceiver;
a processor connected to the transceiver; and
a memory connected to the processor, the memory storing instructions controlling operation of the processor and the transceiver, the instructions causing the processor and transceiver to:
receive a control message on an enhanced physical downlink control channel (EPDCCH);
receive a second message indicated by the control message;
receive a demodulation reference signal on the same antenna port as an associated EPDCCH physical resource;
transmit an ACK/NAK signal on a physical uplink control channel (PUCCH) resource determined from the EPDCCH indicating whether the second message was correctly received by the user equipment; and
transmit the ACK/NACK signal using physical uplink control channel format 1a or 1b, wherein the PUCCH resource is determined for at least one EPDCCH physical resource block set based on a lowest indexed control channel element and a UE-specific offset parameter.

14. The UE of claim 13, wherein the instructions are further operable to control the processor and transceiver to receive a signal to determine the PUCCH resource for transmitting the ACK/NAK signal.

15. The UE of claim 13, wherein the instructions are further operable to control the processor and transceiver to receive a signal configuring the user equipment with a set of four PUCCH resources, to receive an indication of a currently assigned PUCCH resource, and to transmit the ACK/NACK signal on the currently assigned PUCCH resource.

16. The UE of claim 13, wherein the PUCCH resource is further determined based on a demodulation reference signal (DMRS) antenna port corresponding to the EPDCCH.

17. A user equipment (UE) comprising a transceiver configured to:
receive a control message on an enhanced physical downlink control channel (EPDCCH);
receive a second message indicated by the control message;
receive a demodulation reference signal on the same antenna port as an associated EPDCCH physical resource;
transmit an ACK/NAK signal on a physical uplink control channel (PUCCH) resource determined from the EPDCCH indicating whether the second message was correctly received by the user equipment; and
transmit the ACK/NACK signal using physical uplink control channel format 1a or 1b, wherein the PUCCH resource is determined for at least one EPDCCH physical resource block set based on a lowest indexed control channel element and a UE-specific offset parameter.

18. The UE of claim 17, wherein the transceiver is further configured to receive a signal to determine the PUCCH resource for transmitting the ACK/NAK signal.

19. The UE of claim 17, wherein the transceiver is further configured to receive a signal configuring the user equipment with a set of four PUCCH resources, to receive an indication of a currently assigned PUCCH resource, and to transmit the ACK/NACK signal on the currently assigned PUCCH resource.

20. The UE of claim 17, wherein the PUCCH resource is further determined based on a demodulation reference signal (DMRS) antenna port corresponding to the EPDCCH.

21. A method comprising:
receiving a control message on an enhanced physical downlink control channel (EPDCCH);
receiving a second message indicated by the control message;
receiving a demodulation reference signal on the same antenna port as an associated EPDCCH physical resource;
transmitting an ACK/NAK signal on a physical uplink control channel (PUCCH) resource determined from the EPDCCH indicating whether the second message was correctly received by the user equipment; and
transmitting the ACK/NACK signal using physical uplink control channel format 1a or 1b, wherein the PUCCH resource is determined for at least one EPDCCH physical resource block set based on a lowest indexed control channel element and a UE-specific offset parameter.

22. The method of claim 21, further comprising receiving a signal to determine the PUCCH resource for transmitting the ACK/NAK signal.

23. The method of claim 21, further comprising:
receiving a signal configuring the user equipment with a set of four PUCCH resources;
receiving an indication of a currently assigned PUCCH resource; and
transmitting the ACK/NACK signal on the currently assigned PUCCH resource.

24. The method of claim 21, wherein the PUCCH resource is further determined based on a demodulation reference signal (DMRS) antenna port corresponding to the EPDCCH.

* * * * *